(12) United States Patent
Sit et al.

(10) Patent No.: US 6,349,336 B1
(45) Date of Patent: Feb. 19, 2002

(54) AGENT/PROXY CONNECTION CONTROL ACROSS A FIREWALL

(75) Inventors: Eric N. Sit, Watchung, NJ (US); James Clough; Dean S. Nelson, both of Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/504,157

(22) Filed: Feb. 15, 2000

Related U.S. Application Data

(63) Continuation-in-part of application No. 09/299,832, filed on Apr. 26, 1999.

(51) Int. Cl.[7] ............................................... G06F 13/00
(52) U.S. Cl. ................................................... 709/227
(58) Field of Search ................................ 709/200, 203, 709/217, 218, 219, 227, 228, 230, 232, 236, 237, 238, 245, 246

(56) References Cited

U.S. PATENT DOCUMENTS

| | | | | | |
|---|---|---|---|---|---|
| 5,790,664 A | * | 8/1998 | Coley et al. | ................. | 709/203 |
| 5,828,893 A | * | 10/1998 | Wied et al. | ................. | 709/229 |
| 5,941,988 A | * | 8/1999 | Bhagwat et al. | ............ | 713/201 |
| 5,944,823 A | * | 8/1999 | Jade et al. | ................... | 713/201 |
| 6,104,716 A | * | 8/2000 | Crichton et al. | ............ | 370/401 |
| 6,148,346 A | * | 11/2000 | Hanson | ....................... | 709/321 |
| 6,185,625 B1 | * | 2/2001 | Tso et al. | ................... | 709/247 |

* cited by examiner

Primary Examiner—Moustafa M. Meky

(57) ABSTRACT

The invention enables a tunneling action that allows a remote processor to communicate with a local processor when the remote processor is coupled to the local processor via a reverse proxy device, a computer network, a firewall and a proxy agent device. Initially, the local processor establishes a communication channel with the remote processor by dispatching a local request message to the proxy agent device. The proxy agent device dispatches the local request message via the firewall and network to the reverse proxy device, thus enabling the firewall to receive a remote response message to the local request message. Thereafter, the remote processor issues a remote request message to the reverse proxy device, which in turn dispatches a remote response message with the remote request message contained therein, to the firewall. Upon receipt by the proxy agent device of the remote response message (via the firewall), the proxy agent device extracts and dispatches the remote request message to the local processor. Dispatch of a local response message by the local processor causes the proxy agent to incorporate the local response message into a local request message and to dispatch the local request message to the remote processor via the firewall and the reverse proxy device.

8 Claims, 5 Drawing Sheets

AGENT/PROXY CONNECTION CONTROL ACROSS A FIREWALL

This Application is a Continuation-in-Part of U.S. patent application, Ser. No. 09/299,832, filed Apr. 26, 1999, still pending.

FIELD OF THE INVENTION

The present invention relates to message transfer across a firewall and, more particularly, to a method for enabling a device that is protected by a firewall to be controlled by a device external to the firewall.

BACKGROUND OF THE INVENTION

Computer data processing systems often include a group of peripheral devices, such as printers, connected to a processor or server, in a local area network (LAN). Software running on the processor allows an operator to configure operating parameters and monitor the performance of all of the locally connected peripherals.

In general, as features and conveniences offered by a computer system are enhanced, the software controlling the system becomes increasingly sophisticated and complex. Installation and troubleshooting of the system often requires specialized knowledge of the system and the peripherals. When confronted with a problem, the operator of the system often must obtain assistance from technical support personnel having this specialized knowledge.

An operator initially seeking assistance typically places a telephone call to a service center and speaks with a technical support representative. The representative first obtains information from the operator regarding the configuration of the particular system at issue, and thereafter guides the operator through an installation or troubleshooting procedure.

Technical support by telephone is almost always time consuming and expensive. It requires the resources of the operator and technical representative, and often involves a long distance telephone call. To be successful, both the operator and the representative must be capable of engaging in a prolonged dialogue and exchanging technical information and directions. This arrangement is susceptible to errors brought on by poor communication or inadequate training of the operator or representative. Even under the best of circumstances, there is no guarantee of success. An unsuccessful session or technical support by telephone can leave the operator with feelings ranging from annoyance to complete frustration, and tarnish the image of the vendor providing the support.

Technical service is improved when the representative has first hand access to the system at issue. This can be achieved by traveling to the site where the system is installed, but necessarily incurs the expense of traveling to and from the site. A preferable alternative is for the representative to have remote access to the system.

The Internet offers a channel by which remotely located computers may exchange information with one another. A first computer may send a request for information, across the Internet, to a second computer. The second computer then responds with a message that includes the desired information.

For purposes of security and system integrity, many organizations install firewalls that restrict the exchange of information with computers outside of the organization. A firewall is interposed between a local computer system and the Internet to block undesired incoming requests and information. Consequently, a local computer system that is protected by a firewall cannot be unconditionally accessed from a remote location.

Referring to FIG. 1, a local computer 50 and a remote computer 70 are coupled across the Internet 65. A proxy machine 60 is operatively interposed between local computer 50 and the Internet 65.

Proxy machine 60 interfaces with the Internet 65 on behalf of local computer 50, and routes messages from the Internet 65 to local computer 50 only when authorized to do so. By way of example, local computer 50 initiates communication with remote computer 70 by sending a request 75, via proxy machine 60, to remote computer 70. Request 75 includes proxy information in a hypertext transfer protocol (HTTP) header that authorizes proxy machine 60 to route a message from remote computer 70 to local computer 50. Subsequently, remote computer 70 sends a response 80, which proxy machine 60 routes to local computer 50.

Proxy machine 60 serves as a firewall to protect the integrity of local computer 50 by preventing unauthorized messages from being routed to local computer 50 from the Internet 65. Not only does proxy machine 60 block unauthorized incoming data, but it also blocks unauthorized incoming requests that would otherwise interrogate local computer 50. Consequently, remote computer 70 cannot unconditionally write data to, or read data from local computer 50.

Since local computer 50 must authorize proxy machine 60 to accept incoming messages on a per message basis, each message from remote computer 70 to local computer 50 must be initiated by local computer 50. In a situation where several messages are exchanged, a pattern of requests and responses is necessary. Local computer 50 sends a request 75, receives a response 76, sends a request 77, receives a response 78, sends a request 79, receives a response 80, etc. In the general case, local computer 50 sends requests to, and receives responses from, remote computer 70.

There is a need for a technical support representative to manage a computer system from which the representative is remotely located. Through remote access, the representative can configure, monitor and troubleshoot the system with little or no intervention on the part of an operator at the system site. Additionally, there is a need for the representative to access a computer system that is protected by a firewall restricting the representative's access to the computer system.

Accordingly, it is an object of the present invention to provide a method for a remote computer system to access a local computer system across the Internet, where a firewall is operatively interposed between the Internet and the local computer system.

It is another object of the present invention to provide a method for a remote computer system to communicate with a local computer system across the Internet, where a firewall is operatively interposed between the Internet and the local computer system and to control such communication through imposition of control functions that avoid a need for modification of applications running on either the local or remote computer systems.

SUMMARY OF THE INVENTION

The invention enables a tunneling action that allows a remote processor to communicate with a local processor when the remote processor is coupled to the local processor via a reverse proxy device, a computer network, a firewall device and a proxy agent device. Initially, the local processor establishes a communication channel with the remote processor by dispatching a local request message to the proxy agent device. The proxy agent device dispatches the local request message via the firewall and network to the reverse proxy device, thus enabling the firewall to receive a remote response message to the local request message. Thereafter, the remote processor issues a remote request message to the reverse proxy device, which in turn dispatches a remote response message with the remote request message contained therein, to the firewall. Upon receipt by the proxy agent device of the remote response message (via the firewall), the proxy agent device extracts and dispatches the remote request message to the local processor. Dispatch of a local response message by the local processor causes the proxy agent to incorporate the local response message into a local request message and to dispatch the local request message to the remote processor via the firewall and the reverse proxy device.

DETAILED DESCRIPTION OF THE INVENTION

In conventional Internet parlance, and according to hypertext transfer protocol (HTTP), a "request" is a message issued by a first processor seeking information from a second processor, and a "response" is a message from the second processor, to the first processor, that includes the requested information. Ordinarily, a processor protected behind a firewall issues requests, and receives responses. In the present invention, the local processor makes a first request to the remote processor, but thereafter, the messages from the remote processor are "requests", and the messages to the remote processor are "responses." Thus is established a reverse HTTP connection for device management outside a firewall.

Figure 2:
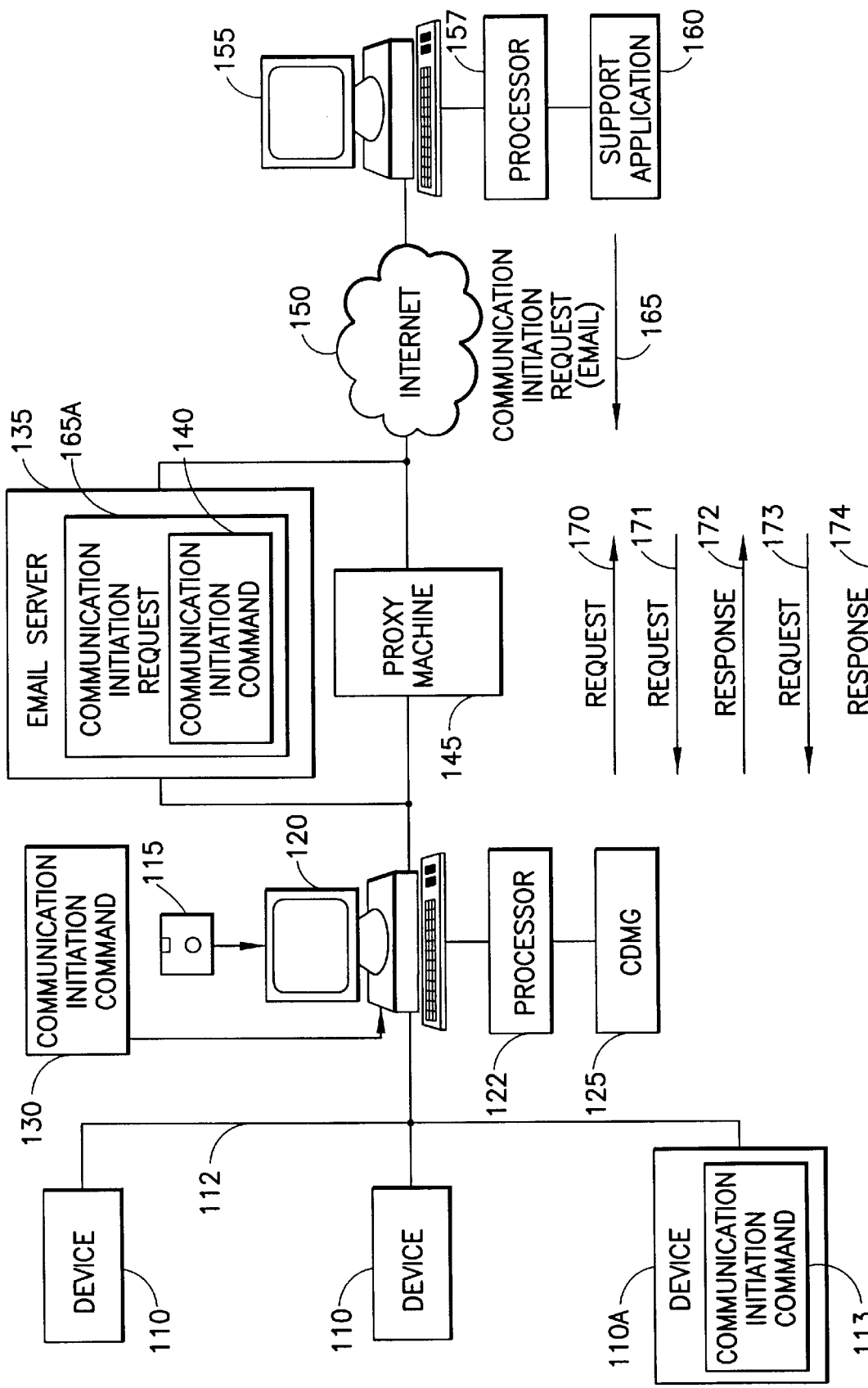
FIG. 2 is a block diagram of a computer system particularly adapted to carry out the present invention.

FIG. 2 is a block diagram of a computer system particularly adapted to carry out the present invention. A group of peripheral devices 110 are coupled to a local processor 122 in a LAN 112. Local computer 120 is coupled to the Internet 150 through a proxy machine 145. A remote computer 155 is also coupled to the Internet 150.

Local computer 120 includes a local processor 122, computer memory (not shown), and a client device management gateway (CDMG) 125. CDMG 125 controls local processor 122 to perform the method of the present invention. Remote computer 155 includes a remote processor 157, and a support application 160 that communicates with CDMG 125 to control devices 110.

CDMG 125 controls local processor 122 to initiate communication with remote processor 157 by sending a request 170, via proxy machine 145, to remote processor 157. Request 170 would typically include information identifying local processor 122 and devices 110. Request 170 also includes proxy information in an HTTP header that authorizes proxy machine 145 to route a message from remote processor 157 to local processor 122. Subsequently, remote processor 157 responds by sending a request 171, which proxy machine 145 routes to local processor 122. Note that request 171 is effectively a response to request 170.

Request 171 is a message indicating one or more commands that are to be executed by local processor 122 with respect to devices 110. For example, the commands may indicate that devices 110 are to be reinitialized. Request 171 can also direct local processor 122 to send information to remote processor 157. For example, support application 160 may require additional information regarding the local processor 122 or the configuration of devices 110. Local processor 122 sends the requested information in response 172.

Response 172 includes proxy information in an HTTP header that authorizes proxy machine 145 to route another "response" message from remote processor 157 to local processor 122. Remote processor 157 thereafter sends a request 173, which proxy machine 145 routes to local processor 122. Request 173 can indicate commands to be executed with respect to devices 110, and can also direct local processor 122 to provide more information to remote processor 157. If request 173 includes a direction for local processor 122 to send additional information, then local computer sends the additional information in response 174.

Figure 1:
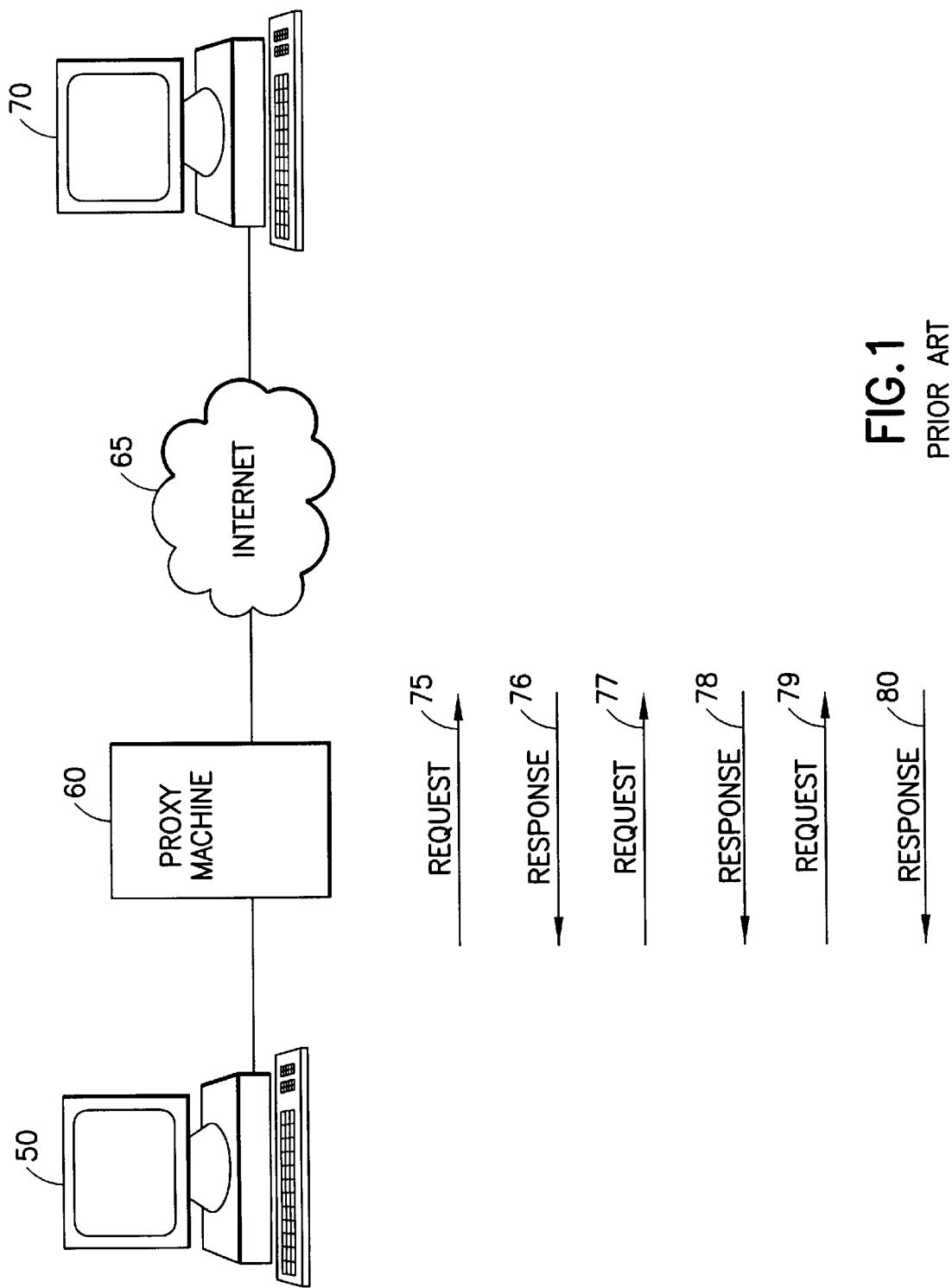
FIG. 1 is a block diagram of a computer system including a local computer coupled to the Internet through a proxy machine according to the prior art.

Note that after request 170 is sent, a pattern of requests and responses becomes apparent. In the general case remote processor 157 sends requests to, and receives responses from, local processor 122. This pattern is opposite of the pattern shown in FIG. 1. Each message (request 170 and responses 172, 174) sent by local processor 122 to remote processor 157, includes proxy information in an HTTP header that authorizes proxy machine 145 to route a message (requests 171, 173) from remote processor 157 to local processor 122. Devices 110 are thereby indirectly controlled from remote processor 157.

CDMG 125 will initiate communication with remote processor 157 in response to a communication initiation command 130 applied through any standard user interface such as a keyboard. This would be the case, for example, when an operator of local processor 122 needs assistance installing or troubleshooting devices 110.

CDMG 125 will also initiate communication in response to a communication initiation command 140 received via electronic mail (email). Using Simple Mail Transfer Protocol (SMTP), remote processor 157 can send a communication initiation request 165, which is stored on email server 135 as communication initiation request 165a. Communication initiation request 165 (and 165a) contains communication initiation command 140. Communication initiation command 140 is executed when communication initiation request 165a is read from email server 135 by CDMG 125, which periodically polls email server 135. Communication initiation request 165 could be used, for example, in a case where the performance of devices 110 is periodically evaluated and calibrated by support application 160. It also allows an opportunity for a third party (not shown) to automatically monitor and calibrate devices 110.

A third method for prompting CDMG 125 to initiate communication can be generated by communication initiation command 113 from within a device 110a. Communication initiation command 113 is used in a case where device 110a automatically runs through a self-test and detects an anomaly, or runs a periodic maintenance program. Device 110a issues communication initiation command 113 to CDMG 125, which then initiates communication with remote processor 157 to begin an automatic test and calibration of device 110*a*.

Figure 3:
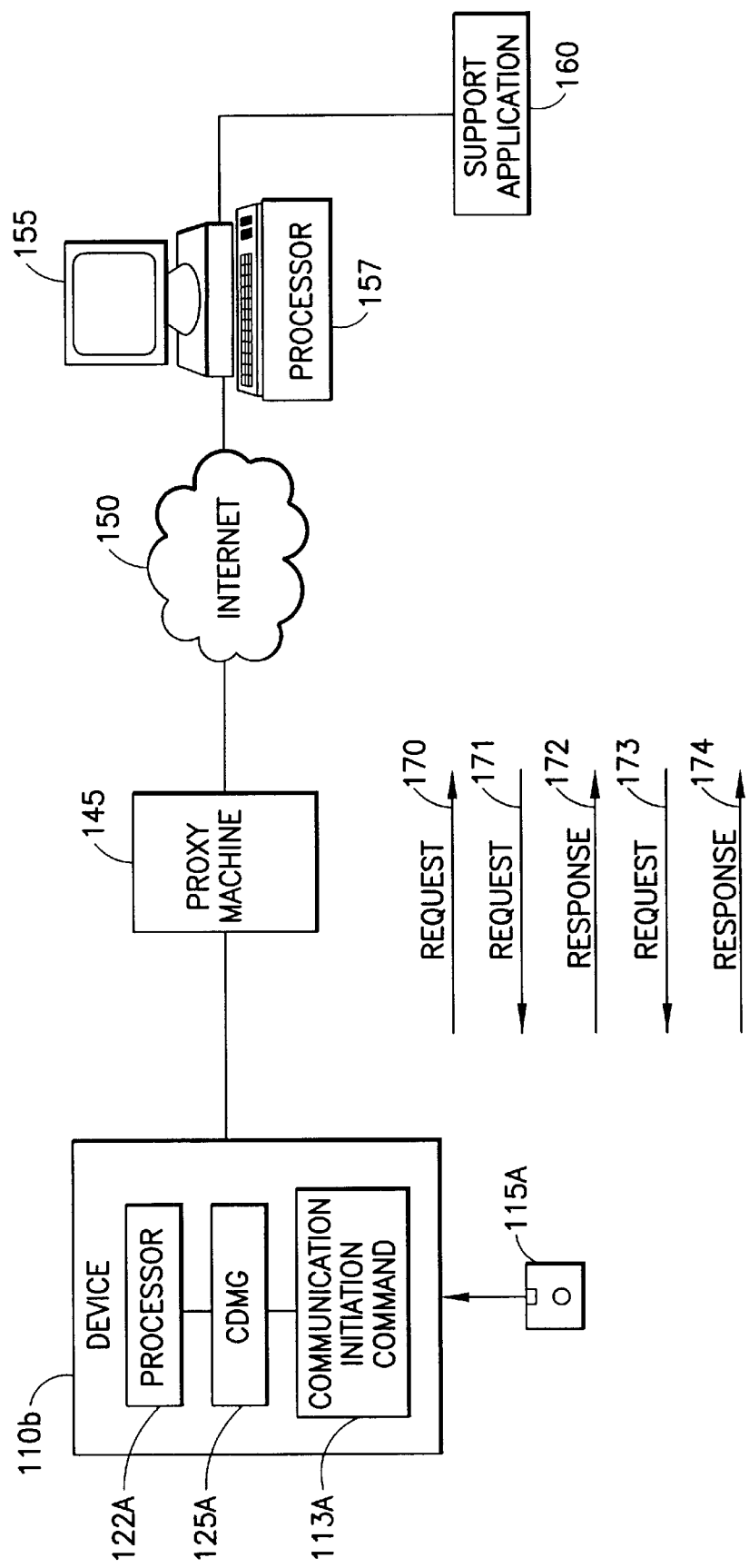
FIG. 3 is a block diagram of an alternative embodiment of a computer system for carrying out the present invention.

FIG. 3 is a block diagram of an alternative embodiment of a computer system for carrying out the present invention. A device 110*b* is coupled to the Internet 150 through a proxy machine 145. A remote computer 155 is also coupled to the Internet 150.

Device 110*b* includes a local processor 122*a*, computer memory (not shown), and a client device management gateway (CDMG) 125*a*. CDMG 125*a* controls local processor 122*a* to perform the method of the present invention. Remote computer 155 includes a remote processor 157, and a support application 160 that communicates with CDMG 125*a* to control device 110*b*.

Communication initiation command 113*a* is generated when device 110*b* automatically runs through a self-test and detects an anomaly, or runs a periodic maintenance program. Communication initiation command 113 prompts CDMG 125*a* to initiate communication with remote processor 157.

CDMG 125*a* controls local processor 122*a* to initiate communication with remote processor 157 by sending a request 170, via proxy machine 145, to remote processor 157. Request 170 would typically include information identifying local processor 122*a* and device 110*b*. Request 170 also includes proxy information in an HTTP header that authorizes proxy machine 145 to route a message from remote processor 157 to local processor 122*a*. Subsequently, remote processor 157 responds by sending a request 171, which proxy machine 145 routes to local processor 122*a*. Note that request 171 is effectively a response to request 170.

Request 171 is a message indicating one or more commands that are to be executed by local processor 122*a* with respect to device 110*b*. For example, the commands may indicate that device 110*b* is to be reinitialized. Request 171 can also direct local processor 122*a* to send information to remote processor 157. For example, support application 160 may require additional information regarding the local processor 122*a* or the configuration of device 10*b*. Local processor 122*a* sends the requested information in response 172.

Response 172 includes proxy information in an HTTP header that authorizes proxy machine 145 to route another "response" message from remote processor 157 to local processor 122*a*. Remote processor 157 thereafter sends a request 173, which proxy machine 145 routes to local processor 122*a*. Request 173 can indicate commands to be executed with respect to device 110*b*, and can also direct local processor 122*a* to provide more information to remote processor 157. If request 173 includes a direction for local processor 122 to send additional information, then local computer sends the additional information in response 174.

This pattern of requests and responses is like that discussed above in the context of FIG. 2. Each message (request 170 and responses 172, 174) sent by local processor 122*a* to remote processor 157, includes proxy information in an HTTP header that authorizes proxy machine 145 to route a message (requests 171, 173) from remote processor 157 to local processor 122*a*. Device 110*b* is thereby indirectly controlled from remote processor 157.

Figure 4:
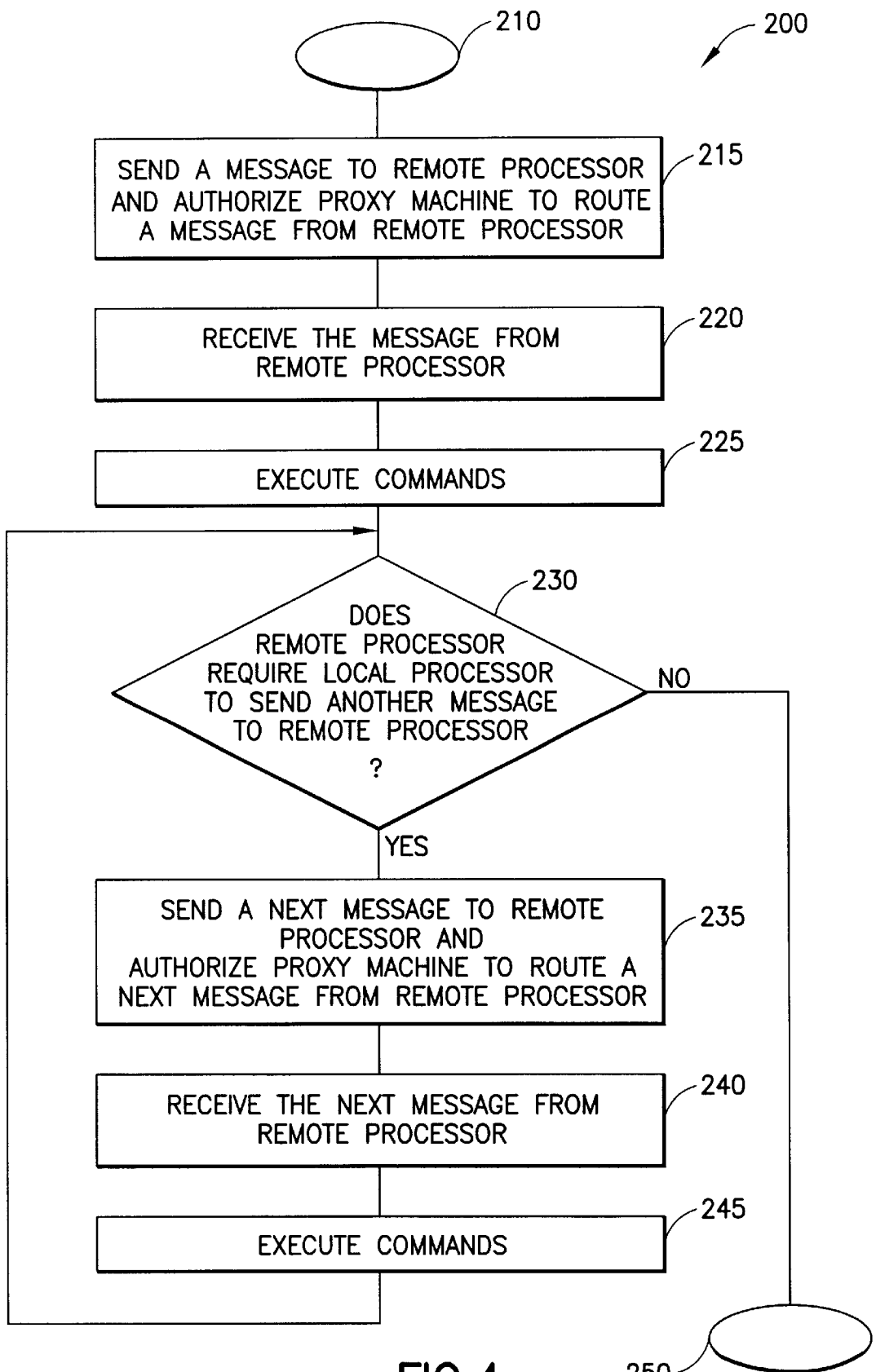
FIG. 4 is a flowchart illustrating the method of the present invention.

FIG. 4 illustrates the logical steps of a device management process, generally indicated by reference number 200, according to the present invention. As mentioned above, device management process 200 can be started by a user-initiated communication initiation command 130, an email communication initiation command 140, or a device-initiated communication initiation command 113. In each case, device management process 200 begins at step 210 and advances to step 215.

In step 215, a local processor sends a message to a remote processor and also authorizes a proxy machine to route a message from the remote processor to the local processor. The message from the local processor is intended to initiate communication between the local processor and the remote processor, and it typically includes configuration information regarding the local processor and the devices to be managed.

In step 220, the local processor receives the message from the remote processor. The message from the remote processor indicates one or more commands to be executed by the local processor.

In step 225, the local processor executes the commands that were indicated in the message from the remote processor in step 220. For example, the commands may require reading a particular device's configuration status, or executing an affirmative action such as reinitializing the device.

In step 230, the local processor further evaluates the message from the remote processor to determine whether the remote processor requires the local processor to send another message to the remote processor. For example, a previous message from the remote processor may have initiated a calibration of a device, and the remote processor now requires some feedback to determine whether the calibration was successful.

The determination made during step 230 also allows the remote processor to control whether the exchange of messages with the local processor will be continued. Recall that the proxy machine routes messages from the remote processor to the local processor only when authorized to do so, and that the authorization is required on a per message basis. Accordingly, every message sent from the remote processor to the local processor must be preceded by an authorization from the local processor to the proxy machine. If the remote processor wishes to maintain communication with the local processor, then in each message to the local processor, the remote processor must direct the local processor to send another message to the remote processor.

If the message from the remote processor indicates that the local processor must send another message, then the process advances to step 235, otherwise the process advances to step 250.

In step 235, the local processor sends a next message to the remote processor and also authorizes the proxy machine to route a next message from the remote processor to the local processor.

In step 240, the local processor receives the next message from the remote processor. This message from the remote processor indicates one or more commands to be executed by the local processor.

In step 245, the local processor executes the commands that were indicated in the message from the remote processor in step 240. The process then loops back to step 230.

In step 250, the process terminates.

Figure 5:
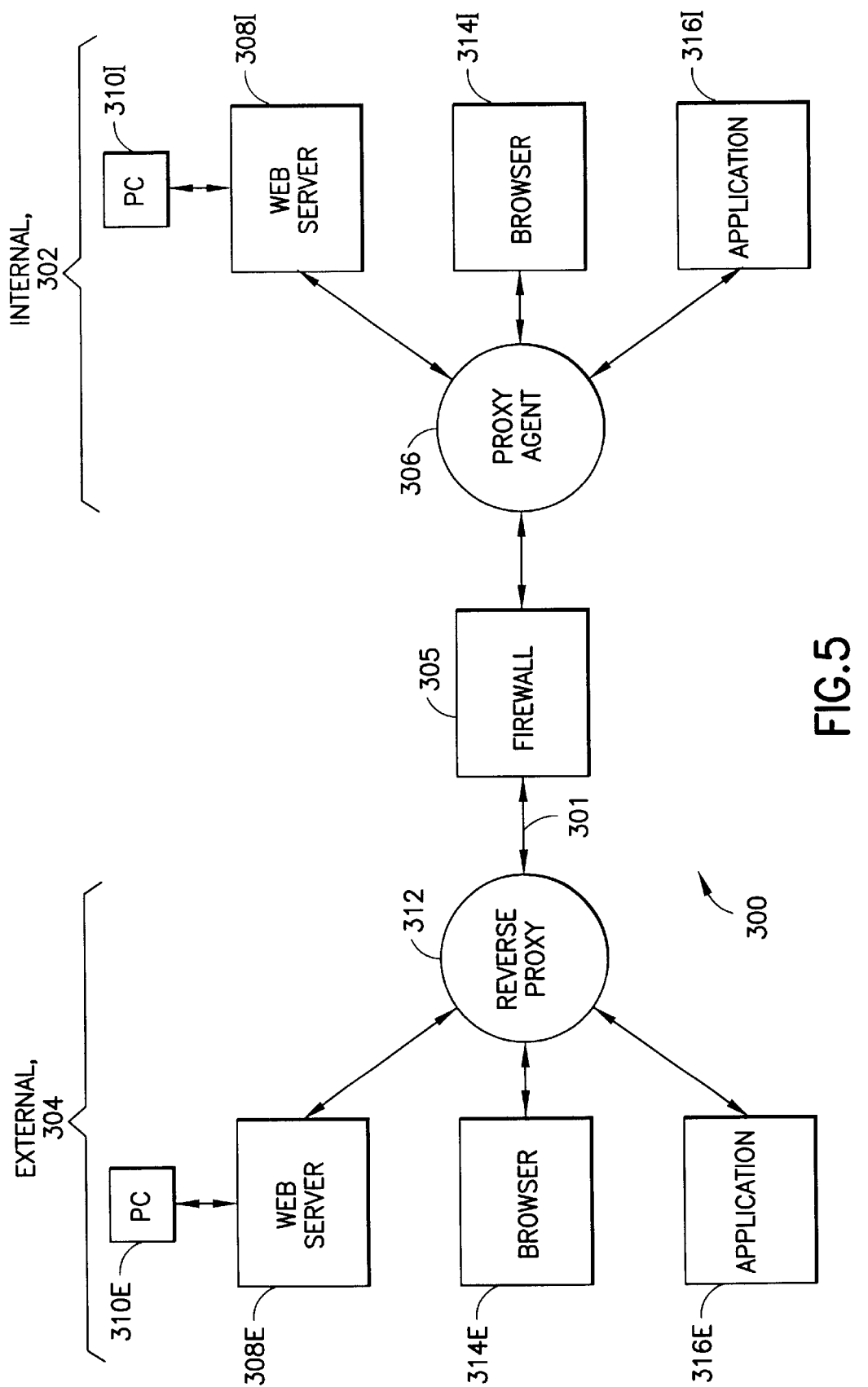
FIG. 5 is a block diagram of an alternative embodiment of the present invention.

As described above, the reverse tunneling protocol provides a simple mechanism for a Web browser to view Web sites that are protected by a firewall. It is a protocol that embodies a system that transmits Web traffic requests and responses in a form that the firewall will allow to pass. In each of the embodiments described above, applications running on Web sites were required to be modified to accommodate the tunneling protocol. To avoid modification of multiple applications, FIG. 5 illustrates an embodiment of the invention wherein independent proxy devices are utilized to provide interfaces to a firewall. These proxy devices implement the reverse HTTP communication protocol in lieu of requiring applications running on servers, browsers, and other Web sites to implement the protocol.

As will be hereafter understood, the embodiment of FIG. 5 enables entities inside a firewall to be able to provide access to an entity outside the firewall. Further, entities inside the firewall have the ability to terminate a reverse http protocol session at any time, preventing a Web browser external to the firewall from accessing a device internal to the firewall.

A computer system 300 includes a firewall 305 interposed between components on an internal side 302 of firewall 305 and an external side 304 of firewall 305. Internal side 302 includes a proxy agent 306 to which is coupled a Web server 308I, a browser 314I and an application 316I. Likewise, external side 304 includes a reverse proxy 312 to which is coupled a Web server 308E, a browser 314E and an application 316E. On the internal side 302, firewall 305 is connected to proxy agent 306, on the external side 304, firewall 305 is connected to reverse proxy 312 via a computer network 301 such as the Internet. Firewall 305 protects devices on the internal side 302 from unwanted communications originating with devices on the external side 304.

Reverse proxy agent 306 forms an interface between firewall 305 and one or more Web servers 308I. Each Web server 308I communicates with the one or more personal computers (PCs) 310I. Each PC 310I incorporates a communication program that conforms to the HTTP protocol. Reverse proxy agent 306 is responsible for interfacing each Web server 308I to firewall 305. Reverse proxy agent 306 (hereafter "agent") initiates a connection, in response to a request received from a Web server 308I, through the firewall to a reverse proxy device 312 positioned on the external side 304 of firewall 305. This connection is kept open until the user closes the connection.

Another function of agent 306 is to extract browser requests that are received over the connection from external components and to forward them to an appropriate Web server 308I. For example, agent 306 makes requests to Web server 308I on behalf of a browser 314E that is located on external side 304 of firewall 305. A further function of agent 306 is to encode responses received from Web server 308I as a request, so as to assure that a subsequent response from browser 314E is passed by firewall 305.

Reverse proxy 312 also functions to "wrap" requests received from one or more browsers 314E by code which is recognized by firewall 305 as a response rather than as a request, which would be blocked by firewall 305. Reverse proxy 312 also maintains the states of each connection, and remembers which agents, such as agent 306, have initiated connections with it so that it knows what servers, such as Web server 308I, are accessible. Similarly, reverse proxy 312 remembers which browsers, such as browser 314E, have opened connections with it. Reverse proxy 312, in a similar manner to agent 306, converts received requests from browser 314E into responses and agent 306 performs the reverse function of converting responses received from reverse proxy 312 into requests which are then and dispatched to the indicated Web server 308I. In the reverse direction, agent 306 converts a response received from a Web server 308I into a request and dispatches that request via firewall 305 to reverse proxy device 312. Upon receipt of the request, reverse proxy 312 "unwraps" the response and dispatches it to the appropriate browser 314E.

In such manner, the protective functionality of firewall 305 is bypassed by the wrapping actions of agent 306 and reverse proxy 312. Except for the initial request that establishes a connection, agent 306 causes responses received from the internal side 302 to look like requests, and converts requests received from firewall 305 into responses. Similarly, reverse proxy 312 causes requests received from firewall 305 to be converted to responses for dispatch to a requesting browser 314E and causes requests received from a browser 314E to look like a response.

Note that the designation of components as being internal or external is merely one of perspective. Communication can also be established between a PC 310E coupled to Web server 308E, and browser 314I. In such a case, the functions of PC 310E, Web server 308E and browser 314I are similar to those of PC310I, Web server 308I and browser 314E, respectively, as described above, and the functional roles of agent 306 and reverse proxy 312 are reversed.

The provision of reverse proxy 312 and agent 306 allows browsers 314I, 314E and Web servers 308I, 308E to be completely ignorant of the reverse tunneling procedure. The procedure is also transparent to applications such as 316I and 316E that interface directly with agent 306 and reverse proxy 312, respectively. Accordingly, the present invention is implemented without any modification of code or addition of code with respect to applications 316I, 316E, applications running on the PCs 310I, 310E, Web servers 308I, 308E and browsers 314I, 314E. Agent 306 and reverse proxy 312 may be completely implemented in software and resident on the same machine as firewall 305, or resident on separate machines.

It should be understood that the foregoing description is only illustrative of the invention. Various alternatives and modifications can be devised by those skilled in the art without departing from the invention. For example, the devices being managed can be any computer peripheral, another computer, or the local processor itself. Also, in the case of a system that does not include a firewall or proxy machine, the process can be applied by merely eliminating the step of authorizing the proxy machine to route a message to the local processor. Further, while the procedures required to execute the invention hereof are indicated as already loaded into the memory of the local computer, they may be configured on a storage media, such as data memory 115 in FIG. 2 or data memory 115a in FIG. 3, for subsequent loading into the local computer. Accordingly, the present invention is intended to embrace all such alternatives, modifications and variances that fall within the scope of the appended claims.

What is claimed is:

1. A method for enabling tunneling action that enables a remote processor to communicate with a local processor when said remote processor is coupled to said local processor via a reverse proxy device, a computer network, a firewall and a proxy agent device, said method comprising the steps of:

(a) controlling said local processor to establish a communication channel with said remote processor by dispatching a local request message to said proxy agent device, said proxy agent device dispatching said local request message via said firewall, said network to said reverse proxy device, said firewall enabled by said proxy agent device to receive a remote response message to said local request message;

(b) upon establishment of said communication channel, enabling said remote processor to issue a remote request message to said reverse proxy device which in turn, dispatches a remote response message with said remote request message contained therein; and (c) upon receipt by said proxy agent device of said remote response message via said firewall, controlling said proxy agent device to extract and dispatch said remote request message to said local processor, whereby said proxy agent device and reverse proxy device enable said tunneling action without modification of communication applications on either said local processor or said remote processor.

2. The method as recited in claim 1, further comprising the step of:

(d) controlling said proxy agent device to respond to receipt of a local response message from said local processor to said remote request message, by incorporating said local response message into a local request message and dispatching said local request message to said remote processor via said firewall, said network and said reverse proxy device, said firewall enabled by said proxy agent device to receive a remote response message to said local request message.

3. The method as recited in claim 2, comprising the further step of:

(e) upon receipt by said reverse proxy device of said local request message via said firewall, controlling said reverse proxy device to extract and dispatch said local response message to said remote processor.

4. The method as recited in claim 1, wherein said computer network is the Internet and messages dispatched between said proxy agent device and said reverse proxy device are configured in HTTP format.

5. A system for enabling tunneling action that allows a remote processor to communicate with a local processor when said remote processor is coupled to said local processor via a computer network and a firewall, said system comprising:

(a) proxy agent means responsive to a local request from said local processor, for establishing a communication channel with said remote processor by dispatching a local request message through said firewall, said firewall enabled by said proxy agent means to receive a remote response message to said local request message;

(b) reverse proxy means responsive to receipt of said local request message and receipt of a remote request message from said remote processor, to dispatch a remote response message with said remote request message contained therein; and wherein, upon receipt by said proxy agent means of said remote response message via said firewall, said proxy agent means extracts and dispatches said remote request message to said local processor, enabling said proxy agent means and reverse proxy means to implement said tunneling action without modification of communication applications on either said local processor or said remote processor.

6. The system as recited in claim 5, wherein said proxy agent means further responds to receipt of a local response message from said local processor to said remote request message, by incorporating said local response message into a local request message and dispatching said local request message via said firewall, said network to said reverse proxy means, said firewall enabled by said proxy agent means to receive a remote response message to said local request message.

7. The system as recited in claim 6, wherein upon receipt by said reverse proxy means of said local request message via said firewall, said reverse proxy means extracts and dispatches said local response message to said remote processor.

8. The system as recited in claim 5, wherein said computer network is the Internet and messages dispatched between said proxy agent means and said reverse proxy means are configured in HTTP format.

* * * * *